United States Patent [19]

Strobel et al.

[11] Patent Number: 4,501,714

[45] Date of Patent: Feb. 26, 1985

[54] METHOD FOR MOLDING A CERAMIC ARTICLE

[75] Inventors: Klaus Strobel; Klaus Geiger, both of Selb, Fed. Rep. of Germany

[73] Assignee: Hutschenreuther Aktiengesellschaft, Selb, Fed. Rep. of Germany

[21] Appl. No.: 469,302

[22] Filed: Feb. 24, 1983

[30] Foreign Application Priority Data

Mar. 2, 1982 [DE] Fed. Rep. of Germany ....... 3207565

[51] Int. Cl.[3] .......................... B29C 9/00; B29D 9/00; B29D 31/00

[52] U.S. Cl. ...................................... 264/245; 101/41; 264/255; 264/314; 427/113; 427/256; 427/264

[58] Field of Search ....................... 118/212, 241, 243; 101/41, 44; 264/245, 314, 60, 255; 425/90, 96, 98, 100; 427/133, 135, 256, 264

[56] References Cited

U.S. PATENT DOCUMENTS

| | | | |
|---|---|---|---|
| 259,724 | 6/1882 | Sims | 264/60 |
| 264,505 | 9/1882 | Anderson | 264/60 |
| 644,530 | 2/1900 | Mercer | 264/62 |
| 838,496 | 12/1906 | Bigot | 264/60 |
| 2,202,465 | 5/1940 | Pattison | 101/41 |
| 2,334,307 | 11/1943 | Bauer | 264/60 |
| 2,603,149 | 7/1952 | Mann | 101/41 |
| 2,623,452 | 12/1952 | Emerson | 101/41 |
| 2,728,158 | 12/1955 | Bach | 264/60 |
| 2,745,339 | 5/1956 | Fernandez | 101/41 |
| 2,748,696 | 6/1956 | Murray | 101/41 |
| 2,842,046 | 7/1958 | Murray | 101/41 |
| 3,228,326 | 1/1966 | Childress | 101/41 |
| 3,756,165 | 9/1973 | Valiela | 101/41 |
| 3,868,901 | 3/1975 | Valiela | 101/41 |
| 3,871,293 | 3/1975 | Valiela | 101/41 |
| 3,885,522 | 5/1975 | MacDonald et al. | 101/41 |
| 4,187,774 | 2/1980 | Iwasa et al. | 101/41 |
| 4,350,486 | 9/1982 | Croseck et al. | 425/DIG. 44 |

FOREIGN PATENT DOCUMENTS

| | | | |
|---|---|---|---|
| 1067448 | 10/1959 | Fed. Rep. of Germany | 101/41 |
| 2521602 | 5/1975 | Fed. Rep. of Germany . | |
| 424226 | 5/1911 | France | 101/41 |
| 0030862 | 3/1981 | Japan | 101/44 |
| 0091294 | 6/1982 | Japan | 101/41 |
| 472796 | 9/1937 | United Kingdom | 101/41 |
| 831330 | 3/1956 | United Kingdom . | |
| 803485 | 10/1958 | United Kingdom | 101/41 |
| 848076 | 9/1960 | United Kingdom | 101/41 |
| 991653 | 4/1962 | United Kingdom . | |
| 1046764 | 10/1962 | United Kingdom . | |
| 1253535 | 11/1971 | United Kingdom | 101/41 |
| 1589666 | 6/1976 | United Kingdom . | |

*Primary Examiner*—Willard E. Hoag
*Attorney, Agent, or Firm*—Toren, McGeady and Stanger

[57] ABSTRACT

In the manufacture of a molded article from a ceramic material, such as a porcelain substance, in which a design or decorative substance is applied to at least one of the surfaces of the article, a certain amount of the ceramic material is introduced into a mold cavity formed between mold parts. The material is distributed in the cavity and then is pressed. The decorative substance is applied to the surface of at least one of the mold parts before the parts are closed to form the mold cavity. The decorative substance is then transferred to the molded article during the pressing operation.

20 Claims, 3 Drawing Figures

METHOD FOR MOLDING A CERAMIC ARTICLE

SUMMARY OF THE INVENTION

The present invention is directed to a method of and apparatus for producing a molded article from a ceramic material, such as a porcelain substance, with a design formed on the molded article, and in producing the article a certain amount of the material is introduced into a mold cavity, formed between mold parts, the introduced material is distributed within the cavity and then is pressed.

In known methods of this type, the designs, particularly decorative colors are printed on the molded article after the completion of the pressing operation. In particular, if the molded article has a curved surface, the procedure involves the application and removal, such as by scraping off or wiping off, liquid or pasty decorative colors on an engraved design carrier and subsequently the design is removed from the design carrier by a spatially deformable transfer carrier, such as a membrane or projection member of plastic or elastic material and, finally, the design is transferred by means of the transfer carrier onto the molded article.

Therefore, the primary object of the present invention is to simplify the production operation in a ceramics factory, such as a porcelain factory, and to reduce the working operations needed for the production of a molded article which is provided with a decorative substance design on its surface.

In accordance with the present invention, before the mold parts are closed for forming the mold cavity, a decorative substance is applied to at least one of the surfaces of the mold parts forming the article. The decorative substance is transferred onto the article during the pressing operation.

It is surprising that the operation embodying the present invention can be performed at all, and it is even more surprising that the designs can be produced with a sharpness and faithfulness to minute details which is at least equal if not superior to the sharpness and faithfulness to minute details of design obtained in previously known operations. It must be considered that during the production of molded articles by pressing within a mold cavity where the articles are formed of a ceramic material, such as spray-dried porcelain grain, even before pressing takes place extensively uniform distribution of the material within the mold cavity is effected, however, displacement of the material still takes place at the surfaces of the molded article. A person skilled in the art considering the present invention would expect that such material displacement would result in a completely uncontrollable design arrangement on the surface of the molded article, or at least the boundary lines of the design would be distorted so that the design would be of inferior quality and the resultant product would not be marketable.

In fact, tests employing the present invention have shown that complicated designs of a single color or multiple colors, as are required on household dishes, can be manufactured employing the present invention with the required sharpness and faithfulness to minute details.

It is readily evident that the mode of operation according to the present invention leads to considerable savings in ceramic factories, particularly porcelain factories. The savings in manpower is not so decisive, because the manufacturing step in the production of molded articles and in printing is, to a great extent, automatic. It is more significant in a ceramics factory that the space required for subsequent printing of the molded articles is not needed and the transport distance of sensitive molded articles from the site of the molded article production to the site of the printing operation is eliminated.

The method embodying the present invention is suitable for the production of molded articles with flat surfaces as well as with curved decorated surfaces. Printing with multiple colors is just as possible as with a single color. Basically, all known design printing processes can be used. The production of the printed molded articles is carried out in the same manner as in the known methods where the molded articles were printed after pressing.

While the decorative substances may be applied in liquid or pasty form, they can also be applied in powder form onto the surfaces of the mold parts.

In particular, in the production of designs which are complicated in geometry or color, the decorative substance is preferably applied with the distribution which corresponds to the desired design or pattern onto a carrier for the design pattern and subsequently is transferred from the carrier onto the mold part. In the present invention, the carrier for the design or pattern can be placed directly in contact with the surface of the mold part, however, it is also possible to use a separate transfer carrier which takes the design or pattern substance from the carrier by means of contact and then transfers the design or pattern onto the surface of the mold part.

Plastic or elastics materials are particularly useful as the transfer carrier, for instance, a transfer carrier in the form of a projection of elastic or plastic material or a membrane of such material is advantageous. The transfer using an elastic or plastic transfer carrier has the considerable advantage that the design distribution can first be placed on a flat carrier, such as an engraved metal plate, which can be easily scraped, and, subsequently, the planar design or pattern can be transferred onto a cylindrical or spatially curved surface of a mold part using the elastic or plastic transfer carrier. The material for forming the design or pattern can be placed on the planar carrier in a form which is distorted as compared to the final desired appearance and, subsequently, during the transfer of the design onto the surface of the mold part, rectification of the design takes place due to the deformation of the design carrier or the transfer carrier. Moreover, it is also possible to apply the material forming the design or pattern directly onto the corresponding mold part in the correct distribution for forming the design or pattern, for instance in an electrostatic field which corresponds to the design or pattern.

In the conventional production of ceramic material molded articles particularly of porcelain material, there are different ways in which the pressing operation can be effected. In one operation, the mold parts are rigid in the area of the surface which creates the molded articles, for instance they are formed of steel. It is also possible and frequently desired for reasons of easier processing, to coat the surfaces of the mold parts which form the molded articles with an elastic lining especially a hard elastic lining. According to the method embodying the present invention, the designs can be applied onto rigid as well as onto elastic surfaces forming the molded articles.

The method according to the invention can be used, whether the pressing of the molded articles is effected by the mutual approach of the mold parts formed essentially rigid or, as in the so-called isostatic pressing, where the pressing effect is developed by pressurizing the rear side of a mold lining membrane.

The best results were achieved in accordance with the present invention when spray-dried procelain grain was used as the starting material for producing the molded articles. As the decorative material, all materials are acceptable which are known in the formation of patterns or designs on ceramics and porcelain, that is, materials which can be in the liquid, pasty or powder form, particularly substances based on oxide dyes.

Further, the invention is also directed to the apparatus used in carrying out the method. Such apparatus includes a press mold made up of at least two mold parts defining a mold cavity. A design transfer device is assigned to at least one of the mold parts and, as indicated above, can be based on a great variety of designs or patterns and transfer principles.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
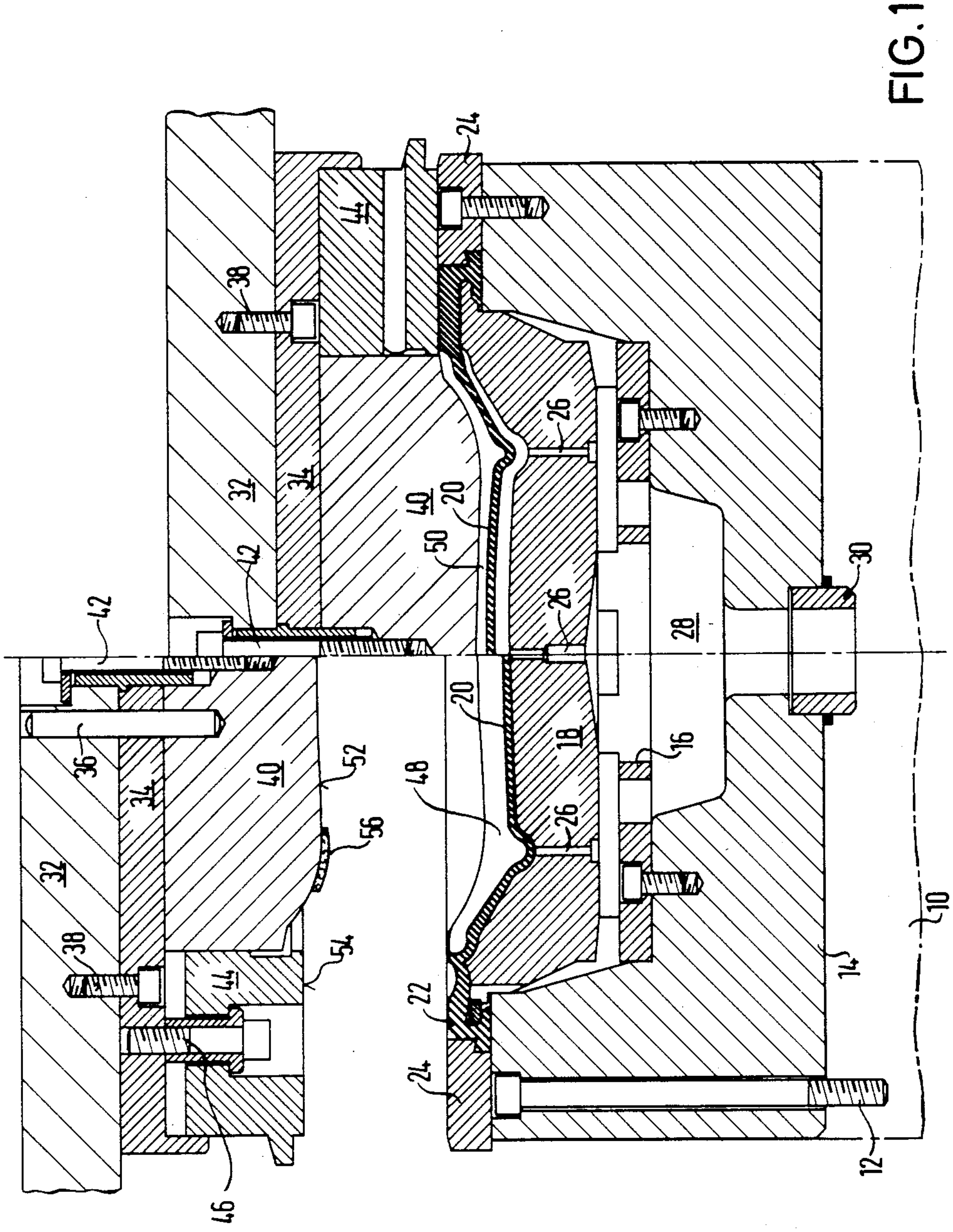
FIG. 1 is a sectional view of mold parts for producing molded articles by means of isostatic pressing, where on the left-hand side the mold parts are shown spaced apart and on the right-hand side the mold parts are shown pressed together forming the mold cavity.

In FIG. 1, a lower press table 10 is illustrated. An isostatic press chamber 14 is secured on the lower press table by bolts 12. In the isostatic press chamber 14, a lower mold 18 is positioned on a supporting grate 16. The upper surface of the lower mold 18 is covered with an isostatic press membrane 20 formed of hard elastic rubber or the like. An edge bulge 22 in the isostatic press membrane 20 is secured by a retaining ring 24 to the isostatic press chamber 14. A number of ducts 26 extend through the lower mold 18 and connect it to a pressure distribution space 28 in the isostatic press chamber 14. Pressure distribution space 28 is in communication, via a connection fitting 30, to a source of a high pressure medium, not shown. Above the lower press table 10, a vertically adjustable upper press ram 32 is arranged in the left half of FIG. 1 in its upper position so that the mold cavity can be cleaned and filled and also from which the pressed molded article can be removed.

In the right half of FIG. 1, the press ram is moved downwardly into its lower position in which the mold cavity is closed and the pressing of the molded article takes place. At the upper press ram 32 a top mold support plate 34 is secured by centering pins 36 and screw bolts 38. A central upper mold part 40 is positioned against the underside of the top mold support plate 34 and it is secured by a central support 42 located within the upper press ram 32 and the top mold support plate 34. The central upper mold part 40 is surrounded by a press ring 44 which is vertically adjustable relative to the upper mold support plate 34 and is shown, in the left half of FIG. 1, secured by means of suspension bolts 46. In the left half of FIG. 1 the press ring 44 is spaced below the underside of the upper mold support plate 34 while in the right half of FIG. 1 the press ring 44 has been pressed against the underside of the top mold support plate 34. In the position of the upper press ram 32, as shown in the left half of FIG. 1, the upwardly open mold depression 48, defined by the isostatic press membrane 20, can be filled by a proportioning dispenser, not shown, with ceramic material, such as a spray-dried procelain grain. After the required amount of the ceramic material is filled into the mold depression 48, the material is distributed in the mold depression by a moving plate, not shown, so that the surface of the resulting layer of the ceramic material is prepared, if possible, according to the outline of the central upper mold part 40 and the press ring 44. Subsequently, the upper press ram 32 is lowered from the position shown in the left half of FIG. 1 into the position shown in the right half, however, the isostatic press membrane 20 remains in contact with the surface of the lower mold 18. As the upper press ram 32 is lowered, initially the press ring 44 contacts the ring 24 and the bulge 22 of the isostatic press membrane 20 with the press ring 44 moving upwardly relative to the upper mold support plate 34 until it comes into contact with that support plate. In this position, a mold cavity 50 is formed between the central upper mold part 40 and the upper press ring 44 and the lower mold 18 in which space or cavity the ceramic material is held. The upper press ram 32 is pressed under high pressure against the lower press table 10 so that the mold cavity 50 is tightly closed.

It should be noted that the filling and distribution of powdery ceramic material into the mold cavity 50 can take place after the mold cavity has been closed, particularly utilizing a so-called mold shooting in which the mold cavity 50 is maintained at a negative pressure and the mold material is shot under atmospheric pressure or at a positive pressure into the mold cavity, so that with the appropriate construction and distribution of air suction openings, a uniform distribution of the ceramic material in the mold cavity can be achieved.

After the mold cavity is closed with the ceramic material distributed, a high hydraulic pressure is applied into the pressure distribution space 28 and the pressure flows through the bores 26 against the underside of the isostatic press membrane 20 so that the membrane is forced into the mold cavity 50 being lifted upwardly from the surface of the lower mold 18 for pressing the ceramic material into a molded article.

In the embodiment shown in the drawing, a household dish, for instance a plate, is produced. To provide the surface of the dish with a design or pattern, a decorative material is applied to the underside 52 of the central upper mold 40 and, if necessary, is also applied to the underside 54 of the upper mold ring. The decorative material applied to the surfaces 52, 54 transfers during the pressing operation onto the surface of the molded article within the mold cavity 50. As is shown in the left half of FIG. 1, the central upper mold 40 and the ring mold 44 can be provided with a hard elastic coating with the decorative material applied on this coating.

Figure 2:
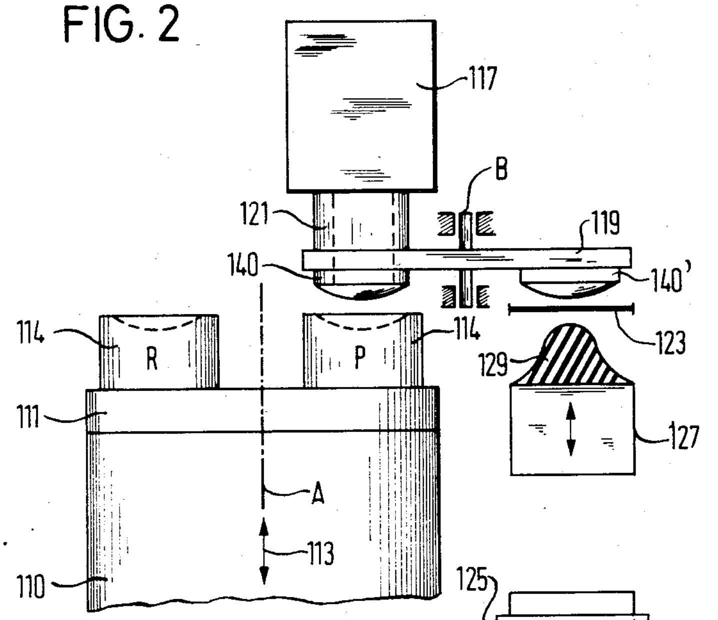
FIG. 2 is an elevational view of a rotating press with the mold parts arranged for producing molded articles.
Figure 3:
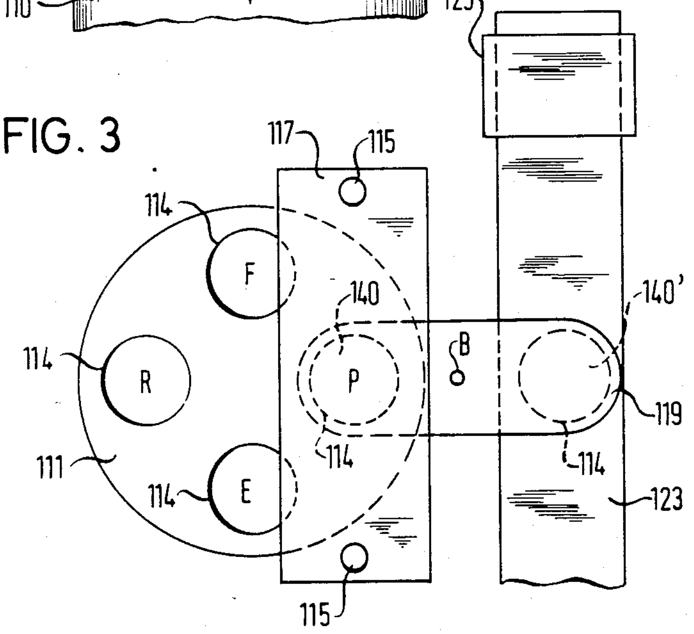
FIG. 3 is a top view of the mold press shown in FIG. 2.

According to FIGS. 2 and 3, a lower press table 110 rotatably supports a table 111 which can be rotated about the axis of rotation A relative to the lower press table in 90° angular steps. Further, the lower press table 110 can be raised and lowered in the direction of the double headed arrow 113. Four isostatic press chambers 114 are spaced angularly apart by 90° on the rotating table 111. An upper press crossbar 117, supported by columns 115, is located above the lower press table 110. A rotary plate 119 is supported so that it rotates about an axis of rotation B located laterally from the rotating table 111 and the upper press crossbar 117. Two upper molds 140, 140' are located on the underside of the rotary plate 119. In FIGS. 1 and 2, the upper mold 140 is located in vertical alignment with one of the four isostatic press chambers 114, that is, with the press chamber positioned in the press position P. The rotary plate 119 is supported in the upward direction by a support member 121 extending downwardly from the upper press crossbar 117. When the lower press table 110 moves in the upward direction of the double headed arrow 113, the mold cavity is closed, as described above in reference to FIG. 1, and the isostatic pressing of the molded article takes place. While the pressing operation takes place a decorative material is applied to the other upper mold 140' located in a position offset by 180° from the upper mold 140 in the press position P. The angular position of the upper mold 140' relative to the other upper mold 140 is angularly disposed relative to the axis B. The decorative material is applied to the upper mold 140 by a transfer membrane 123 which, as is shown in FIG. 3, moves as an endless band below the upper mold 140'. The decorative material in the form a design or pattern is deposited on the membrane 123 at an application station 125. The application station 125 can be in the form of an etched steel plate, previously coated and scraped with liquid or pasty printing ink for depositing the desired design onto the membrane 123. The membrane 123 can be advanced in steps corresponding to the distance between the application station 125 and a die 127 aligned below the upper mold 140' and arranged to be moved in the direction of the double headed arrow shown on the die in FIG. 2. When the design or pattern, applied in the application station onto the top side of the membrane 123, is located above the die 127, the die is located below the upper mold 140' on the rotary plate 119. On the upper side of the die 127 there is a projection or protuberance 129 of an elastically deformable silicone rubber. When the die moves upwardly, it engages the membrane 123 and the combination of the membrane and the projection deform and contact the lower surface of the upper mold 140 transferring the design from the membrane onto the surface of the upper mold. When the pressing step between the upper mold 140 and the isostatic press chamber 114 is completed in the press station P, then the rotating table 111 is advanced by 90° while the rotary plate 119 is rotated through 180°. The next isostatic press chamber 114 moves into the press station P and at the same time the upper mold 140' is located below the support member 121 so that during the next pressing operation at the press station P the design is transferred onto the molded article.

As can be seen in FIG. 3, the isostatic press chambers 114, after moving out of the press station P enter into removal station E where the molded article with the desired design is removed. During further movement of the rotating table 111 the empty press chamber 114 enters a cleaning station R where the isostatic membrane (see membrane 20 in FIG. 1) is cleaned. Next, the cleaned press chamber 114 moves into a filling station F where the ceramic material is filled into the mold depression 48 (FIG. 1) of the isostatic press membrane.

It is also possible for the rotary plate 119 to move through a cleaning station, and in such an instance the rotary plate 119 would be advanced in 120° angular steps with the upper molds 140, 140' passing successively through three stations. In a first station the upper mold would receive the design or pattern from the band-shaped membrane 123, at a second station the upper mold would interact with a corresponding isostatic press chamber 114, and at a third station it would be cleaned.

The band-shaped membrane 123 may be an endless band which is guided over rollers and passes through a cleaning station before it reaches the application or printing station 125.

While specific embodiments of the invention have been shown and described in detail to illustrate the application of the inventive principles, it will be understood that the invention may be embodied otherwise without departing from such principles.

We claim:

1. A method of producing a molded article from a ceramic material, such as procelain material, with a design or pattern applied to at least part of the surface of the molded article comprising:

(a) providing a mold, said mold consisting of at least two mold parts (18, 20; 40), each of said two mold parts (18, 20; 40) having a mold surface, the mold surfaces of said mold parts (18, 20; 40) defining a mold cavity;

(b) preforming a design or pattern of decorative material on a transfer carrier (123);

(c) transferring said design or pattern to the mold surface of at least one of said mold parts (18, 20; 40);

(d) filling said mold cavity with a dry powdered ceramic material, (e) subjecting said powdered ceramic material within said mold cavity to a molding pressure such as to produce the respective molded article, the pattern or design of decorative material being transferred from said molding surface to said molded article during said pressing step by said molding pressure;

(f) said decorative material being applied to a curved molding surface of a mold part, including the steps of preforming the decorative material onto a planar carrier in a form distorted as compared to the desired design form, and rectifying the distorted design form in transferring the decorative substance from the carrier to the mold part.

2. A method, as set forth in claim 1, comprising applying the decorative material in a liquid form in preforming the design or pattern.

3. A method, as set forth in claim 1, comprising applying the decorative material in a pasty form in preforming the design or pattern.

4. A method, as set forth in claim 1, comprising applying the decorative material in the form of a powder in preforming the design or pattern.

5. A method, as set forth in claim 1, including initially applying the decorative material in the form of the design to be applied to the molded article onto a carrier before preforming the decorative material in the design form from the carrier to the transfer carrier, and transferring the decorative material in the design form from the transfer carrier to the surface of the mold part.

6. A method, as set forth in claim 1, wherein the pressing step is carried out by moving essentially rigid mold parts toward one another.

7. A method, as set forth in claim 1, wherein the pressing step is effected by directing pressure against the surface of a mold lining membrane opposite the surface forming the molded article.

8. A method, as set forth in claim 1, wherein the decorative material is based on oxide dyes.

9. A method, as set forth in claim 5, including the step of transferring the decorative material in the design form from the transfer carrier to the mold part using an outwardly curved member formed of one of elastic or plastics material.

10. A method, as set forth in claim 5, including applying the decorative substance onto an engraved surface carrying the design form and scraping the engraved surface.

11. A method, as set forth in claim 5, wherein the transfer carrier is formed of one of a plastic or elastic material.

12. A method, as set forth in claim 11, wherein the transfer carrier is in the form of a band-shaped membrane.

13. A method of producing a molded article from a ceramic material, such as porcelain material, with a design or pattern applied to at least part of the surface of the molded article comprising (a) providing a mold, said mold consisting of at least two mold parts (18, 20; 40), each of said two mold parts (18, 20; 40) having a mold surface, the mold surfaces of said mold parts (18, 20; 40) defining a mold cavity;

(b) preforming a design or pattern of decorative material on one of the mold surfaces;

(c) filling said mold cavity with a dry powdered ceramic material, (d) subjecting said powdered ceramic material within said mold cavity to a molding pressure such as to produce the respective molded article, the pattern or design of decorative material being transferred from said molding surface to said molded article during said pressing step by said molding pressure said decorative material being applied to a curved molding surface of a mold part, including the steps of preforming the decorative material onto a planar carrier in a form distorted as compared to the desired design form, and rectifying the distorted design form in transferring the decorative substance from the carrier to the mold part.

14. A method, as set forth in claim 13, including preforming the decorative material in powder form in an electrostatic field corresponding to the form of the design.

15. A method, as set forth in claim 13, wherein the pressing step is carried out by moving essentially rigid mold parts toward one another.

16. A method, as set forth in claim 13, wherein the pressing step is effected by directing pressure against the surface of a mold lining membrane opposite the surface forming the molded article.

17. A method, as set forth in claim 13, wherein the decorative material is based on oxide dyes.

18. The method of claim 1 or 13 wherein said dry powdered material is spray-dried porcelain grains.

19. A method, as set forth in claim 13, including preforming the decorative material onto a rigid molding surface of the mold parts.

20. A method, as set forth in claim 19, wherein the rigid surface comprises a metallic surface.

* * * * *